(12) United States Patent
Si et al.

(10) Patent No.: US 10,732,382 B2
(45) Date of Patent: Aug. 4, 2020

(54) HIGH-PIXEL LENS WHICH INCREASES A LENGTH OF A FRONT HALF

(71) Applicant: LIAONING ZHONGLAN ELECTRONIC TECHNOLOGY CO LTD, Panjin, Liaoning (CN)

(72) Inventors: Congfang Si, Liaoning (CN); Tae Young Kim, Liaoning (CN)

(73) Assignee: LIAONING ZHONGLAN ELECTRONIC TECHNOLOGY CO LTD, Panjin, Liaoning (CN)

( * ) Notice: Subject to any disclaimer, the term of this patent is extended or adjusted under 35 U.S.C. 154(b) by 105 days.

(21) Appl. No.: 16/035,719

(22) Filed: Jul. 16, 2018

(65) Prior Publication Data

US 2018/0321466 A1    Nov. 8, 2018

(51) Int. Cl.
*G02B 9/34*       (2006.01)
*G02B 27/09*      (2006.01)
*G02B 5/20*       (2006.01)
*G02B 13/00*      (2006.01)

(52) U.S. Cl.
CPC .............. *G02B 9/34* (2013.01); *G02B 5/20* (2013.01); *G02B 5/208* (2013.01); *G02B 13/004* (2013.01); *G02B 27/0955* (2013.01)

(58) Field of Classification Search
CPC ........ G02B 9/34; G02B 5/208; G02B 13/004; G02B 27/0955; G02B 5/20
See application file for complete search history.

(56) References Cited

U.S. PATENT DOCUMENTS

2012/0327522 A1*   12/2012   Tsai .................... G02B 9/34
                                                    359/715

* cited by examiner

*Primary Examiner* — Joseph P Martinez

(57) ABSTRACT

A high-pixel lens which increases a length of a front half includes: an aperture diaphragm S, a first lens piece L1, a second lens piece L2, a third lens piece L3, a fourth lens piece L4 and an optical filter in sequence from an object side to an image side, wherein the L1, the L2, the L3 and the L4 are all plastic aspheric lens pieces, wherein: the L1 is a biconvex lens piece having a positive focal power; the L2 is a meniscus lens piece having a negative focal power and being convex towards the image side; the L3 is a biconvex lens piece having a positive focal power, and at least one side of the L3 has an inflection point; and the L4 is a biconcave lens piece having a negative power, and at least one side of the L4 has at least one inflection point.

11 Claims, 4 Drawing Sheets

HIGH-PIXEL LENS WHICH INCREASES A LENGTH OF A FRONT HALF

BACKGROUND OF THE PRESENT INVENTION

Field of Invention

The present invention relates to a technical field of high-pixel micro lens, and more particularly to a high-pixel lens which increases a length of a front half thereof.

Description of Related Arts

With the development of the lens industry, the environment where customers use micro lenses is changing, and the structural requirements are becoming more diverse. Conventional micro lenses are compact lenses, wherein the thickness of the lens pieces and the air spacing between the lens pieces are relatively small. For satisfying the special use environment of the customer, the present invention increases the distance between the diaphragm and the L3 to achieve the purpose that the front end of the lens is long and small while the rear end of the lens has a normal structure. Therefore, it is particularly necessary to develop a high-pixel lens that increases a length of a front half.

SUMMARY OF THE PRESENT INVENTION

An object of the present invention is to provide a high-pixel lens which increases a length of a front half. The high-pixel lens has a special lens structure and a diaphragm is placed at a foremost end. In order to increase the length of a front end, a first lens piece L1 and a second lens piece L2 are relatively thick, and air spacing between the lens pieces is also large. A third lens piece L3 is a biconvex lens piece, with an inflection point on a first surface and a very low vector height. This ensures that a distance from the diaphragm to the L3 can be maximized, so as to meet the customer's special conditions of use. A maximum half image height of the optical system is 2.4 mm, F2.0 large aperture is adopted, and a rear working distance is 0.7 mm<FBL<0.86 mm. The structure of the high-pixel lens is convenient for molding and structural design. In optimization of the optical system, mass production is considered, and optimization of a system tolerance is increased. According to a conventional maximum production tolerance simulation, a yield rate is more than 65%.

Accordingly, in order to accomplish the above object, the present invention provides a high-pixel lens which increases a length of a front half, comprising: an aperture diaphragm S, a first lens piece L1, a second lens piece L2, a third lens piece L3, a fourth lens piece L4 and an optical filter in sequence from an object side to an image side, wherein the first lens piece L1, the second lens piece L2, the third lens piece L3 and the fourth lens piece L4 are all plastic aspheric lens pieces, wherein:

the first lens piece L1 is a biconvex lens piece having a positive focal power;

the second lens piece L2 is a meniscus lens piece having a negative focal power and being convex towards the image side;

the third lens piece L3 is a biconvex lens piece having a positive focal power, and at least one side of the third lens piece L3 has an inflection point; and the fourth lens piece L4 is a biconcave lens piece having a negative power, and at least one side of the fourth lens piece L4 has at least one inflection point.

Preferably, a focal length f1 of the first lens piece L1 and a focal length f3 of the third lens piece L3 satisfy:

$$1 < f1/f3 < 3.$$

Preferably, a focal length f3 of the third lens piece L3 and a focal length f of the high-pixel lens satisfy:

$$0.3 < f3/f < 0.8.$$

Preferably, an object side curvature radius r1 of the first lens piece L1 and an image side curvature radius r2 of the first lens piece L1 satisfy:

$$-2 < r1/r2 < -1.$$

Preferably, an object side curvature radius r4 of the second lens piece L2 satisfies:

$$r4 < 1.$$

Preferably, an object side curvature radius r5 of the third lens piece L3 and an image side curvature radius r6 of the third lens piece L3 satisfy:

$$(r5+r6)/(r5-r6) < 1.$$

Preferably, a center thickness d1 of the first lens piece L1, a center distance d2 between the first lens piece L1 and the second lens piece L2, a center thickness d3 of the second lens piece L2, a center distance d4 between the second lens piece L2 and the third lens piece L3, and a maximum half image height IH satisfy:

$$0.75 < (d1+d2+d3+d4)/IH < 0.85.$$

Preferably, a center thickness d1 of the first lens piece L1 and a center distance d2 between the first lens piece L1 and the second lens piece L2 satisfy:

$$1 < d1/d3 < 3.5.$$

Preferably, a center distance d2 between the first lens piece L1 and the second lens piece L2, and a center distance d4 between the second lens piece L2 and the third lens piece L3 satisfy:

$$3.0 < d4/d2 < 10.0.$$

Preferably, a vector height Z5 of the third lens piece L3 satisfies:

$$Z5 < 0.1.$$

Preferably, a focal length f of the high-pixel lens and a total length TL of the high-pixel lens satisfy:

$$TL/f > 1.5.$$

These and other objectives, features, and advantages of the present invention will become apparent from the following detailed description, the accompanying drawings, and the appended claims.

DETAILED DESCRIPTION OF THE PREFERRED EMBODIMENT

Figure 1:
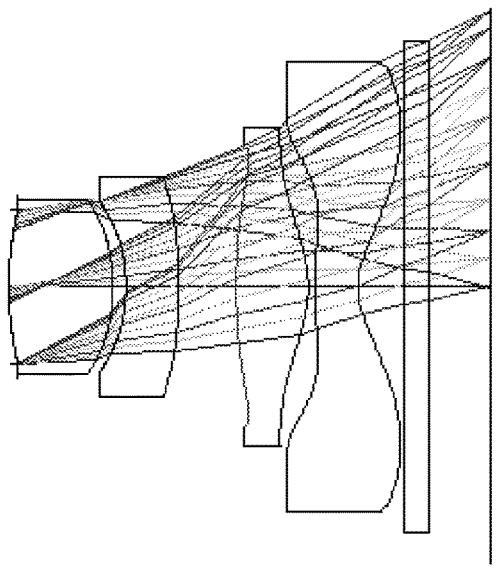
FIG. 1 is a plane view of a high-pixel lens of the present invention.

Referring to the drawings, the present invention will be further illustrated.

The present invention provides a high-pixel lens which increases a length of a front half, comprising: an aperture diaphragm S, a first lens piece L1, a second lens piece L2, a third lens piece L3, a fourth lens piece L4 and an optical filter in sequence from an object side to an image side, wherein the first lens piece L1, the second lens piece L2, the third lens piece L3 and the fourth lens piece L4 are all plastic aspheric lens pieces, wherein:

the first lens piece L1 is a biconvex lens piece having a positive focal power;

the second lens piece L2 is a meniscus lens piece having a negative focal power and being convex towards the image side;

the third lens piece L3 s a biconvex lens piece having a positive focal power, and at least one side of the third lens piece L3 has an inflection point; and the fourth lens piece L4 is a biconcave lens piece having a negative power, and at least one side of the fourth lens piece L4 has at least one inflection point.

Preferably, a focal length f1 of the first lens piece L1 and a focal length f3 of the third lens piece L3 satisfy:

$$1 < f1/f3 < 3.$$

Preferably, a focal length f3 of the third lens piece L3 and a focal length f of the high-pixel lens satisfy:

$$0.3 < f3/f < 0.8.$$

Preferably, an object side curvature radius r1 of the first lens piece L1 and an image side curvature radius r2 of the first lens piece L1 satisfy:

$$-2 < r1/r2 < -1.$$

Prefers an object side curvature radius r4 of the second lens piece L2 satisfies:

$$r4 < 1.$$

Preferably, an object side curvature radius r5 of the third lens piece L3 and an image side curvature radius r6 of the third lens piece L3 satisfy:

$$(r5+r6)/(r5-r6) < 1.$$

Preferably, a center thickness d1 of the first lens piece L1, a center distance d2 between the first lens piece L1 and the second lens piece L2, a center thickness d3 of the second lens piece L2, a center distance d4 between the second lens piece L2. and the third lens piece L3, and a maximum half image height IH satisfy:

$$0.75 < (d1+d2+d3+d4)/IH < 0.85.$$

Preferably, a center thickness d1 of the first lens piece L1 and a center distance d2 between the first lens piece L1 and the second lens piece L2 satisfy:

$$1 < d1/d3 < 3.5.$$

Preferably, a center distance d2 between the first lens piece L1 and the second lens piece L2, and a center distance d4 between the second lens piece L2 and the third lens piece L3 satisfy:

$$3.0 < d4/d2 < 10.0.$$

Preferably, a vector height Z5 of the third lens piece L3 satisfies:

$$Z5 < 0.1.$$

Preferably, a focal length f of the pixel lens and a total length TL of the high-pixel lens satisfy:

$$TL/f > 1.5.$$

FIG. 1 is a plane view of a high-pixel lens of the present invention, which illustrates that lens piece shapes of the optical system is uniform and easy to molding. In addition, distribution of the lens pieces is relatively balanced, and the distances between the lens pieces meet special requirements through post structure design.

Figure 2:
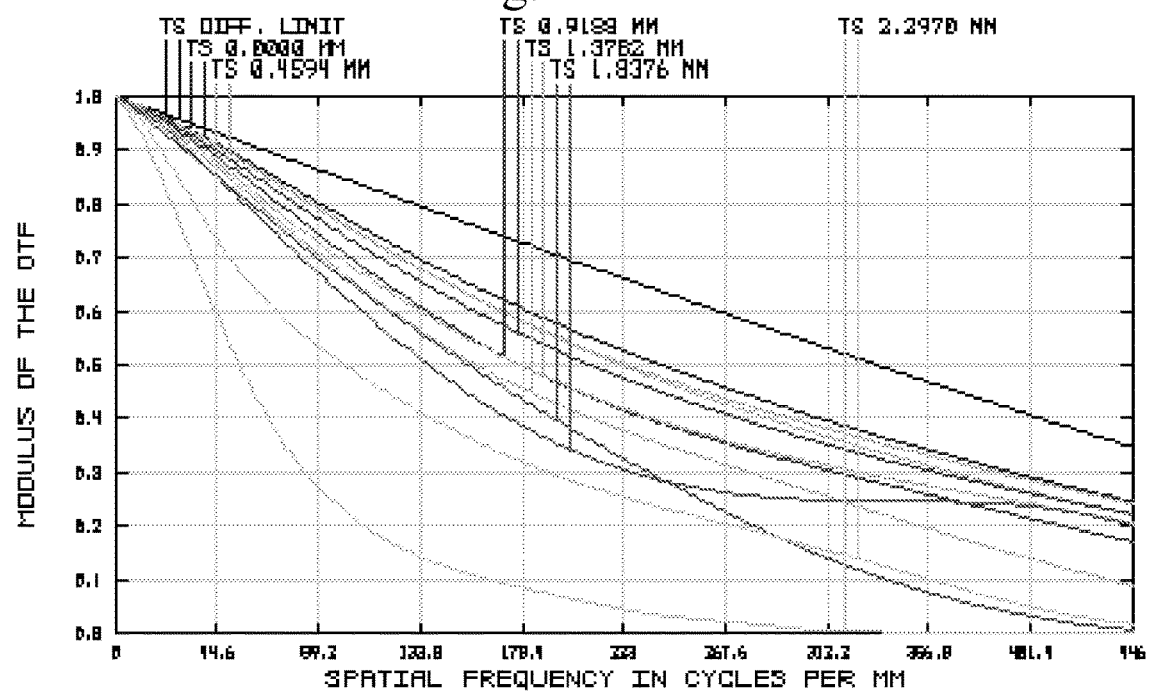
FIG. 2 illustrates a modulation transfer function of the high-pixel lens of the present invention.

FIG. 2 illustrates a modulation transfer function (MTF) of the high-pixel lens of the present invention, which comprehensively reflects the image quality of the optical system. The smoother the shape of the curve is, the larger a height relative to an X-axis will be, which means a better imaging quality of the optical system and a high sharpness of the high-pixel lens of the present invention. At a rate of 110 lp/mm, MTF is less than 0.6 within a view field of 0.8.

Figure 3:
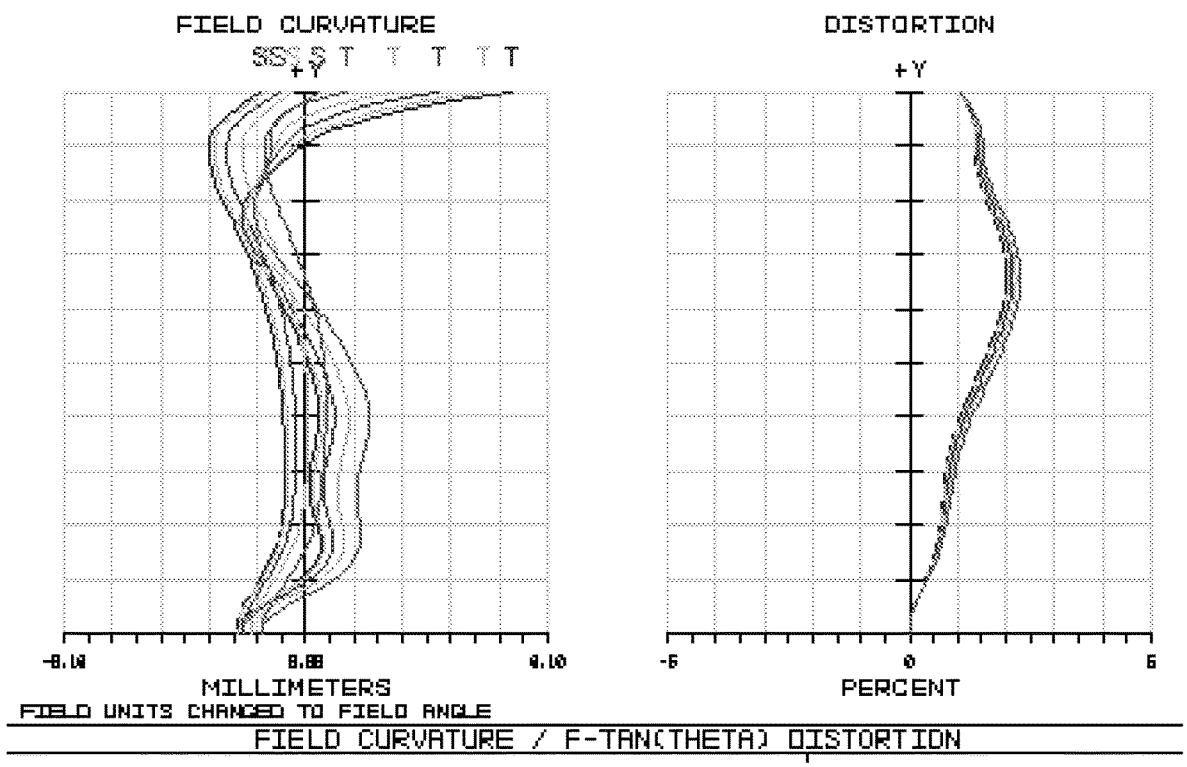
FIG. 3 illustrates a field curvature and a distortion of under different wavelengths of the high-pixel lens of the present invention.

FIG. 3 illustrates a field curvature and a distortion of under different wavelengths of the high-pixel lens of the present invention. Different colors represent different wavelengths. S represents the sagittal field curvature, T represents the meridian field curvature, and a difference between the two is the astigmatism of the optical system. Astigmatism and field curvature are important aberrations affecting the off-axis view field light, wherein excessive astigmatism will seriously affected the imaging quality of the system off-axis light, and the field curvature will lead to that the best imaging of the center and the edge is not in one plane. Referring to a left part in the FIG. 3, the field curvature and the astigmatism within the view field of 0.8 are both corrected to 0.04 mm or less. A right part in the FIG. 3 illustrates distortion curves of the optical system. Distortion does not affect the sharpness of the system, but it will cause deforming. The optical distortion of the optical system of the present invention is less than 2% and has been corrected to a very good condition.

Figure 4:
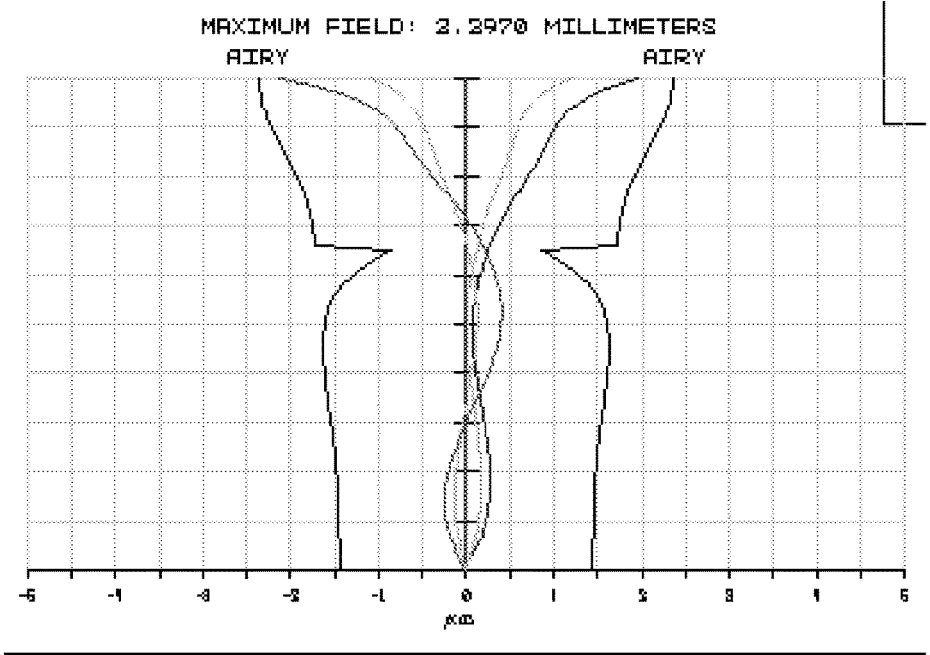
FIG. 4 illustrates a lateral color difference of an imaging system of the high-pixel lens of the present invention.

FIG. 4 illustrates a lateral color difference of an imaging system of the high-pixel lens of the present invention. The lateral color difference indicates the difference in the focus position of each color wavelengths on the entire image plane of the optical system, wherein the smaller the lateral color difference is, the better the convergence of the light rays of different color wavelengths will be. The lateral color difference of the optical system within the view field of 0.9 is controlled within 2 μm.

Figure 5:
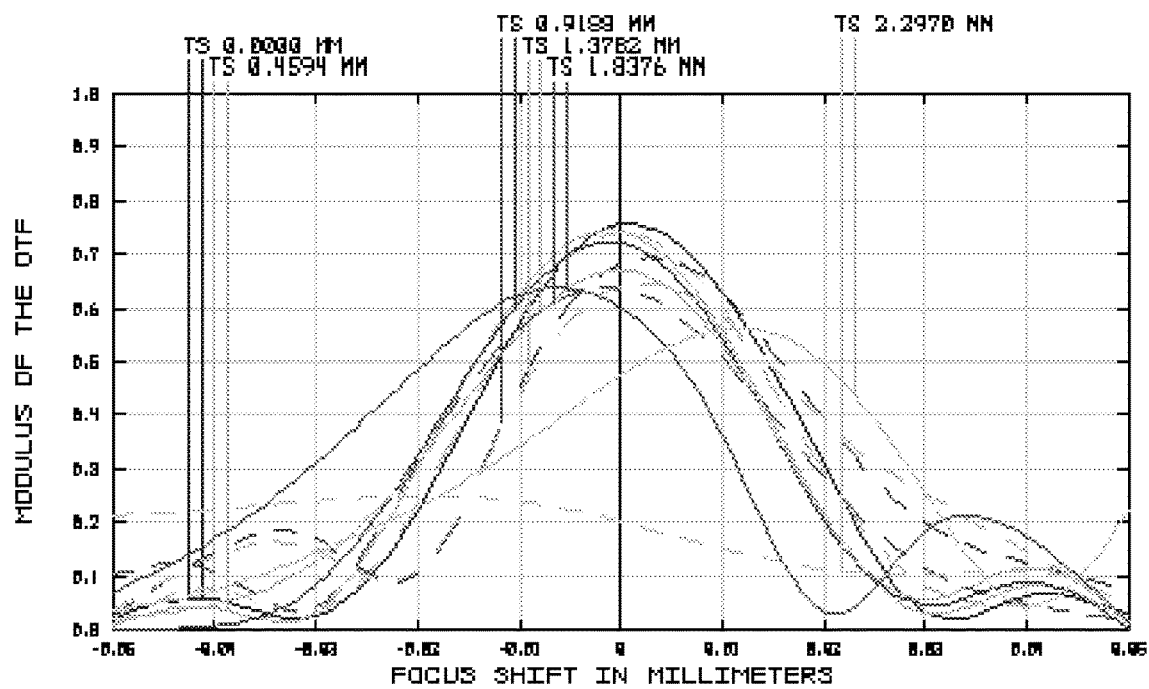
FIG. 5 illustrates a through focus diagram of the imaging system of the high-pixel lens of the present invention.

FIG. 5 illustrates a through focus diagram of the imaging system of the high-pixel lens of the present invention, namely optical properties and defocus amounts of view fields of 0, 0.2, 0.4, 0.6, 0.8 and 1.0, If a peak of the curve is closer to a center point, then the optical property is better, and the field area is smaller.

The high-pixel lens of the present invention adopts four aspheric plastic lens pieces to enhance imaging sharpness of the optical system, and can be used to optimize aberrations, reduce influence of aberrations, and obtain better image resolution capability. A main concept of the present invention is to use even-order aspheric surfaces, which can effectively control shapes of the lens pieces and reduce aberration of each position on an image plane of the optical system. The four lens pieces of the present invention are all aspheric, and aspheric surface coefficients satisfy the following equation:

$$Z=cy^2/[1+\{1-(1+k)c^2y^2\}^{+1/2}]+A_4y^4+A_6y^6+A_8y^8+A_{10}y^{10}+A_{12}y^{12}+A_{14}y^{14}+A_{16}y^{16}$$

wherein:
Z: Aspheric vector height,
C: Aspheric near-axis curvature,
y: lens diameter,
k: cone coefficient,
$A_4$: $4^{th}$ power aspheric coefficient,
$A_6$: $6^{th}$ power aspheric coefficient,
$A_8$: $8^{th}$ power aspheric coefficient,
$A_{10}$: $10^{th}$ power aspheric coefficient,
$A_{12}$: $12^{th}$ power aspheric coefficient,
$A_{14}$: $14^{th}$ power aspheric coefficient,
$A_{16}$: $16^{th}$ power aspheric coefficient.

Figure 6:
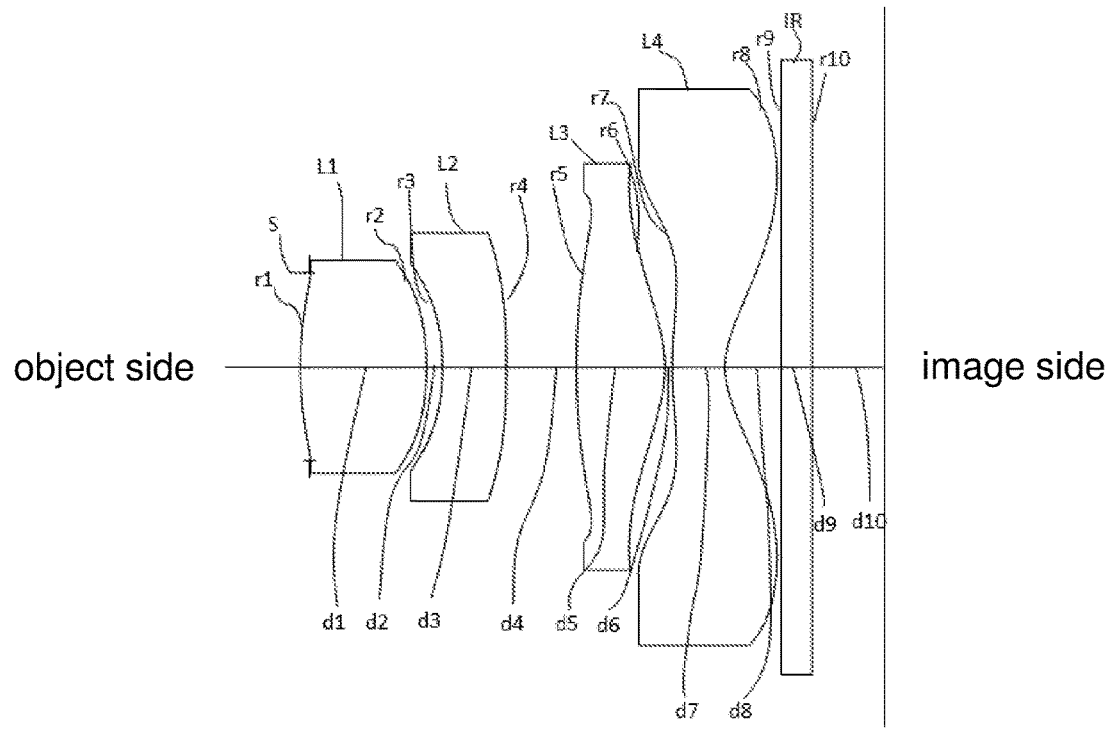
FIG. 6 is a sketch view of the high-pixel lens according to an embodiment 1 of the present invention.

FIG. 6 is a sketch view of the high-pixel lens according to an embodiment 1 of the present invention. Referring to Table 1, design parameters of the high-pixel lens according the embodiment 1 of the present are listed.

| surfaces number | type | curvature | thickness | material refractive index | half caliber | cone coefficient |
|---|---|---|---|---|---|---|
| 0 | spherical | 0 | 500 | | 447.0516 | 0 |
| 1 | spherical | 0 | −0.0631 | | 0.6456 | 0 |
| 2 | aspheric | 0.4128 | 0.8616 | 1.54, 56.1 | 0.6481 | 3.3840 |
| 3 | aspheric | −0.5056 | 0.1103 | | 0.7327 | 5.1832 |
| 4 | aspheric | −0.5803 | 0.4350 | 1.65, 21.5 | 0.7176 | −4.3033 |
| 5 | aspheric | −0.1000 | 0.4831 | | 0.9218 | −9.9977 |
| 6 | aspheric | 0.1834 | 0.6039 | 1.54, 56.1 | 1.2034 | −9.9112 |
| 7 | aspheric | −1.1259 | 0.0500 | | 1.3962 | −9.4552 |
| 8 | aspheric | 0.3804 | 0.3600 | 1.54, 56.1 | 1.4697 | 1.8514 |
| 9 | aspheric | 1.8339 | 0.3840 | | 1.9119 | −4.2084 |
| 10 | spherical | 0 | 0.2100 | BK7 | 2.0219 | 0 |
| 11 | spherical | 0 | 0.5000 | | 2.1097 | 0 |
| 12 | spherical | 0 | 0 | | 2.4726 | 0 |

| surfaces number | $A_4$ | $A_6$ | $A_8$ | $A_{10}$ | $A_{12}$ | $A_{14}$ | $A_{16}$ |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | −0.0086 | −1.3565 | 11.5482 | −56.6555 | 152.5871 | −214.9515 | 122.6904 |
| 3 | −0.3082 | 0.9044 | −1.5698 | −5.1197 | 16.4907 | −35.5340 | 26.1898 |
| 4 | −0.7537 | 2.3062 | −9.0681 | 28.5988 | −54.6770 | 55.1884 | −22.2271 |
| 5 | −0.2129 | 0.6381 | −1.2702 | 2.0689 | −2.2956 | 1.4472 | −0.3769 |
| 6 | 0.0212 | 0.1632 | −0.6157 | 0.9701 | −0.8013 | 0.3351 | −0.0603 |
| 7 | −0.1917 | 1.1752 | −2.7488 | 3.3741 | −2.2283 | 0.7499 | −0.1010 |
| 8 | −0.2391 | 0.5580 | −1.1166 | 1.2122 | −0.6735 | 0.1898 | −0.0219 |
| 9 | −0.1228 | 0.0222 | 0.0193 | −0.0184 | 0.0070 | −0.0013 | 0.0001 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |

Figure 7:
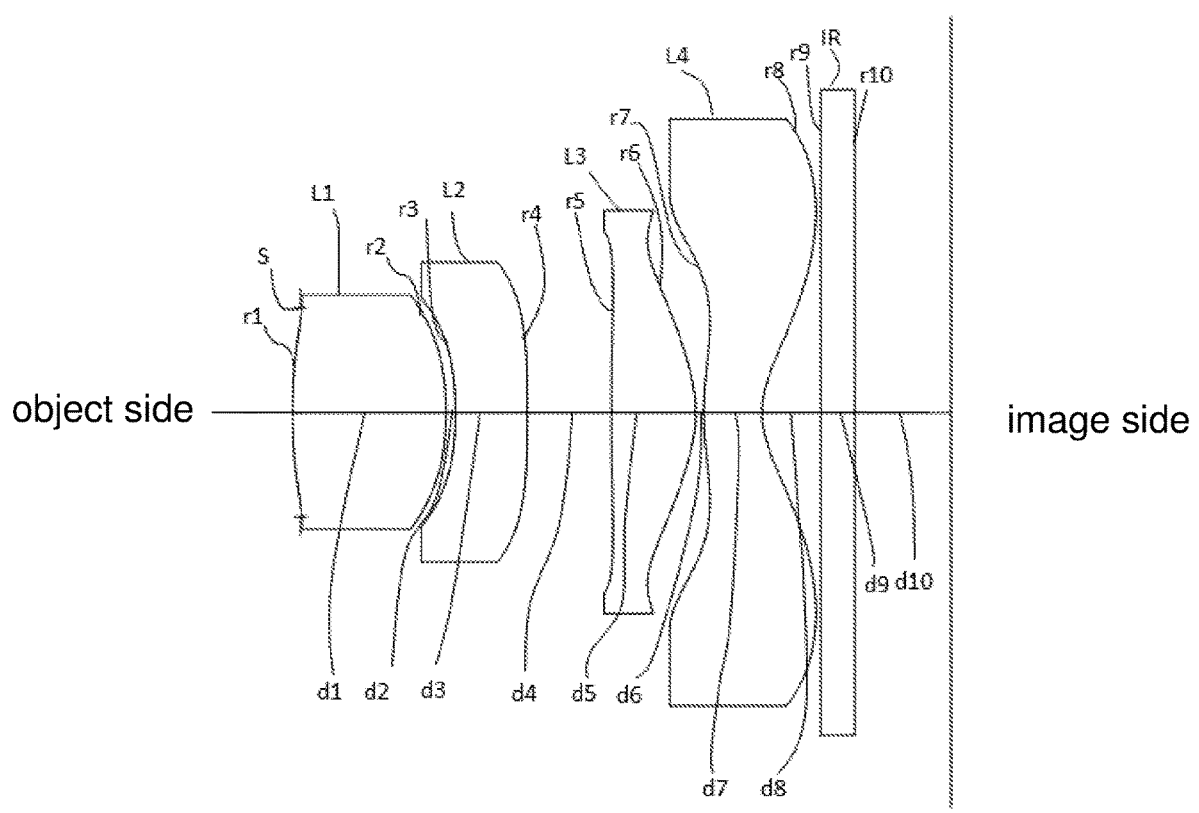
FIG. 7 is a sketch view of the high-pixel lens according to an embodiment 2 of the present invention.

FIG. 7 is a sketch view of the high-pixel lens according to an embodiment 2 of the present invention. Referring to Table 2, design parameters of the high-pixel lens according the embodiment 2 of the present are listed.

| surfaces number | type | curvature | thickness | material refractive index | half caliber | cone coefficient |
|---|---|---|---|---|---|---|
| 0 | spherical | 0 | 500 | | 447.8374 | 0 |
| 1 | spherical | 0 | −0.0515 | | 0.6480 | 0 |
| 2 | aspheric | 0.3414 | 0.9506 | 1.54, 56.1, 0 | 0.6504 | −3.8964 |
| 3 | aspheric | −0.4876 | 0.0579 | | 0.7265 | 1.0736 |
| 4 | aspheric | −0.3681 | 0.4440 | 1.65, 21.5, 0 | 0.7090 | −5.6362 |
| 5 | aspheric | −0.0020 | 0.5275 | | 0.929 | −9.9530 |
| 6 | aspheric | 0.0020 | 0.5188 | 1.54, 56.1, 0 | 1.1212 | 3.8427 |
| 7 | aspheric | −1.1991 | 0.0500 | | 1.2497 | −6.0157 |
| 8 | aspheric | 0.5178 | 0.3600 | 1.54, 56.1, 0 | 1.3763 | 0.1838 |
| 9 | aspheric | 1.9039 | 0.3635 | | 1.8202 | −3.6181 |
| 10 | spherical | 0 | 0.2100 | BK7 | 1.9333 | 0 |
| 11 | spherical | 0 | 0.6000 | | 2.0011 | 0 |
| 12 | spherical | 0 | 0 | | 2.4518 | 0 |

-continued

| surfaces number | $A_4$ | $A_6$ | $A_8$ | $A_{10}$ | $A_{12}$ | $A_{14}$ | $A_{16}$ |
|---|---|---|---|---|---|---|---|
| 0 | 0 | 0 | 0 | 0 | 0 | 0 | 0 |
| 1 | 0 | 0 | 0 | 0 | 0 | 0 | 0 |
| 2 | −0.0500 | 0.4395 | −4.2007 | 20.4439 | −56.4975 | 81.7221 | −48.6188 |
| 3 | −0.9165 | 3.0742 | −13.8442 | 35.0876 | −59.4317 | 56.4358 | −22.0922 |
| 4 | −1.1706 | 3.9819 | −12.1333 | 28.4130 | −48.0743 | 47.3717 | −19.6784 |
| 5 | −0.4082 | 0.6308 | −1.5623 | 1.1753 | −1.0103 | 0.5878 | −0.1588 |
| 6 | 0.1234 | −0.2821 | 0.1390 | 0.3028 | −0.5769 | 0.3958 | −0.1069 |
| 7 | 0.3181 | −0.6049 | 1.2185 | −1.3775 | 0.9842 | −0.3768 | 0.0559 |
| 8 | −0.3066 | −0.4847 | 1.3999 | −1.5941 | 0.9852 | −0.3107 | 0.0388 |
| 9 | −0.2561 | 0.1828 | −0.0796 | 0.0146 | 0.0015 | −0.0010 | 0.0001 |
| 10 | 0 | 0 | 0 | 0 | 0 | 0 | 0 |
| 11 | 0 | 0 | 0 | 0 | 0 | 0 | 0 |
| 12 | 0 | 0 | 0 | 0 | 0 | 0 | 0 |

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A high-pixel lens which increases a length of a front half, comprising: an aperture diaphragm S, a first lens piece L1, a second lens piece L2, a third lens piece L3, a fourth lens piece L4 and an optical filter in sequence from an object side to an image side, wherein the first lens piece L1, the second lens piece L2, the third lens piece L3 and the fourth lens piece L4 are all plastic aspheric lens pieces, wherein:

the first lens piece L1 is a biconvex lens piece having a positive focal power;

the second lens piece L2 is a meniscus lens piece having a negative focal power and being convex towards the image side;

the third lens piece L3 is a biconvex lens piece having a positive focal power, and at least one side of the third lens piece L3 has an inflection point; and the fourth lens piece L4 is a biconcave lens piece having a negative power, and at least one side of the fourth lens piece L4 has at least one inflection point;

wherein aspheric surface coefficients of the first lens piece L1, the second lens piece L2, the third lens piece L3 and the fourth lens piece L4 satisfy the following equation:

$$Z = cy^2/[1+\{1-(1+k)c^2 y^2\}^{+1/2}] + A_4 y^4 + A_6 y^6 + A_8 y^8 + A_{10} y^{10} + A_{12} y^{12} + A_{14} y^{14} + A_{16} y^{16}$$

wherein:

Z: Aspheric vector height,
C: Aspheric near-axis curvature,
y: lens diameter,
k: cone coefficient,
$A_4$: $4^{th}$ power aspheric coefficient,
$A_6$: $6^{th}$ power aspheric coefficient,
$A_8$: $8^{th}$ power aspheric coefficient,
$A_{10}$: $10^{th}$ power aspheric coefficient,
$A_{12}$: $12^{th}$ power aspheric coefficient,
$A_{14}$: $14^{th}$ power aspheric coefficient,
$A_{16}$: $16^{th}$ power aspheric coefficient.

2. The high-pixel lens, as recited in claim 1, wherein a focal length f1 of the first lens piece L1 and a focal length f3 of the third lens piece L3 satisfy:

$$1 < f1/f3 < 3.$$

3. The high-pixel lens, as recited in claim 1, wherein a focal length f3 of the third lens piece L3 and a focal length f of the high-pixel lens satisfy:

$$0.3 < f3/f < 0.8.$$

4. The high-pixel lens, as recited in claim 1, wherein an object side curvature radius r1 of the first lens piece L1 and an image side curvature radius r2 of the first lens piece L1 satisfy:

$$-2 < r1/r2 < -1.$$

5. The high-pixel lens, as recited in claim 1, wherein an object side curvature radius r4 of the second lens piece L2 satisfies:

$$r4 < 1.$$

6. The high-pixel lens, as recited in claim 1, wherein an object side curvature radius r5 of the third lens piece L3 and an image side curvature radius r6 of the third lens piece L3 satisfy:

$$(r5+r6)/(r5-r6) < 1.$$

7. The high-pixel lens, as recited in claim 1, wherein a center thickness d1 of the first lens piece L1, a center distance d2 between the first lens piece L1 and the second lens piece L2, a center thickness d3 of the second lens piece L2, a center distance d4 between the second lens piece L2 and the third lens piece L3, and a maximum half image height IH satisfy:

$$0.75 < (d1+d2+d3+d4)/IH < 0.85.$$

8. The high-pixel lens, as recited in claim 1. wherein a center thickness d1 of the first lens piece L1 and a center distance d2 between the first lens piece L1 and the second lens piece L2 satisfy:

$$1 < d1/d3 < 3.5.$$

9. The high-pixel lens, as recited in claim 1, wherein a center distance d2 between the first lens piece L1 and the second lens piece L2, and a center distance d4 between the second lens piece L2 and the third lens piece L3 satisfy:

$$3.0 < d4/d2 < 10.0.$$

10. The high-pixel lens, as recited in claim 1, wherein a vector height Z5 of the third lens piece L3 satisfies:

$$Z5 < 0.1.$$

11. The high-pixel lens, as recited in claim 1, wherein a focal length f of the high-pixel lens and a total length TL of the high-pixel lens satisfy:

$$TL/f > 1.5.$$

* * * * *